US006961287B2

(12) United States Patent
Jung

(10) Patent No.: US 6,961,287 B2
(45) Date of Patent: Nov. 1, 2005

(54) TIME ERROR COMPENSATING APPARATUS AND METHOD IN A TERMINAL

(75) Inventor: Dong Soo Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 269 days.

(21) Appl. No.: 10/270,332

(22) Filed: Oct. 15, 2002

(65) Prior Publication Data

US 2003/0076747 A1 Apr. 24, 2003

(30) Foreign Application Priority Data

Oct. 19, 2001 (KR) .......................................... 2001/64731

(51) Int. Cl.[7] ............................ G04C 15/00; G04F 5/00; G06F 1/04
(52) U.S. Cl. ...................................... 368/155; 368/202
(58) Field of Search ................................ 368/155, 157, 368/159, 200, 201, 202

(56) References Cited

U.S. PATENT DOCUMENTS

| | | | | | |
|---|---|---|---|---|---|
| 4,024,416 | A | * | 5/1977 | Fujita et al. ................. | 327/115 |
| 4,305,041 | A | * | 12/1981 | Frerking ...................... | 327/39 |
| 4,443,116 | A | * | 4/1984 | Yoshida et al. ............. | 368/202 |
| 5,416,435 | A | * | 5/1995 | Jokinen et al. ............. | 327/113 |
| 5,748,570 | A | * | 5/1998 | Komoda ...................... | 368/202 |
| 5,828,248 | A | * | 10/1998 | Masuda ...................... | 327/113 |
| 5,943,613 | A | * | 8/1999 | Wendelrup et al. ....... | 455/343.1 |
| 6,176,611 | B1 | * | 1/2001 | Schushan et al. .......... | 368/202 |
| 6,219,564 | B1 | * | 4/2001 | Grayson et al. ............ | 455/574 |
| 6,556,512 | B1 | * | 4/2003 | Winkler ...................... | 368/47 |
| 6,729,755 | B1 | * | 5/2004 | Yin ............................. | 368/202 |
| 2003/0174587 | A1 | * | 9/2003 | Bening ........................ | 368/200 |

* cited by examiner

Primary Examiner—Andrew H. Hirshfeld
Assistant Examiner—Leo T. Hinze
(74) Attorney, Agent, or Firm—Fleshner & Kim, LLP

(57) ABSTRACT

A time-error-compensating apparatus and method corrects errors in a real-time clock caused by temperature fluctuations or other external influences. The apparatus includes a frequency counting unit which counts a high-frequency clock signal and a low-frequency clock signal, and a time compensating unit which computes a clock count compensation value based on a comparison of the count values of of the low-frequency and high-frequency clock signals. Correcting time using a high-frequency clock is highly desirable because a clock of this type has proven to be accurate in high external stress conditions. Use of this clock also allows the real-time clock to be implemented as a low-frequency, inexpensive low-frequency clock. The method and apparatus are well suited to correcting time information in the terminals of a mobile communications system, or in any other system or device where time tracking is sought.

25 Claims, 2 Drawing Sheets

TIME ERROR COMPENSATING APPARATUS AND METHOD IN A TERMINAL

BACKGROUND OF THE INVENTION

1. Field of the Invention

The present invention relates to generating time in a signal processing system, and more particularly to a system and method for performing time correction in, for example, a communications system.

2. Background of the Related Art

A Global System Mobile (GSM) terminal and other remote terminals display time using a self-contained RTC circuit, rather than using time information transmitted from a base station.

As shown in FIG. 1, conventional GSM terminals includes a real-time clock (RTC) circuit 10 for counting a low-frequency clock signal of 32.768 KHz and generating time information (second, minute and hour), and a CPU 20 for displaying the time information on LCD 30 generated in synchronization with a high-frequency clock signal of 13 MHz. In the related art, the low-frequency clock signal is generated by a crystal oscillator, and a high-frequency clock signal is a system clock signal generated by a voltage-controlled, temperature-compensated crystal oscillator (VCTCXO).

In generating time information, as previously stated the RTC circuit 10 counts the 32.768 KHz low-frequency clock signal output from the crystal oscillator and generates time information (second, minute and hour). Where the frequency of the currently inputted low-frequency clock signal is precisely 32.768 KHz (X=32768 KHz, as used in the following equation), the RTC circuit 10 sets 1 second when 32768 KHz pulses are counted during a pulse duration and 1 hour when 32768×3600 pulses are counted in the same manner. Thus:

$$\frac{1}{32768} \times 32768 = 1 \text{ second} \tag{1}$$

$$\frac{1}{32768} \times 32768 \times 3600 = 1 \text{ hour}$$

where 1/32768 is a pulse duration and 32768 is the count number. The CPU 20 receives the time information output from the RTC circuit 10 and displays it on the LCD 30, so that a user can be aware if the accurate time by viewing the GSM terminal.

Generally, the crystal oscillator used for generating the 32.768 KHz low-frequency clock signal operates at lower power in order to keep power consumption low, and is implemented using a comparatively low-priced crystal. Although the crystal oscillator can maintain a precise dock timing within a narrow temperature range, frequency variation becomes great and timing error is increased if the crystal is exposed to temperatures outside of a predetermined range. Therefore, when the frequency of the low-frequency clock signal generated from the crystal oscillator is changed due to an external condition (ie., a temperature or a voltage, etc), the time information (second, minute, hour) generated by the RTC circuit 10 is degraded in its accuracy.

For example, if the frequency (X) of the clock signal becomes greater than 32.768 KHz due to an external condition (X>32768 KHz), a time error $T_{error}$ generated during 1 hour can be expressed by equation (2) below.

$$T_{error} = \left(\frac{1}{32768} - \frac{1}{X}\right) \times 32768 \times 3600 \tag{2}$$

Where the time error ($T_{error}$) is converted into the duration of the currently input frequency (X), a pulse count difference generated for 1 hour is computed by the following equation (3).

$$\frac{T_{error}}{\frac{1}{X}} = 3600(X - 32768) \tag{3}$$

With reference to equation (3), if the frequency (X) of the low-frequency clock signal is greater than 32.768 KHz, as many as 3600 (X−32768) pulses are additionally counted in the RTC circuit 10 for 1 hour. Thus, the time information outputted from the RTC circuit 10 becomes fast.

If the frequency (X) of the low-frequency clock signal is smaller than 32.768 KHz (X<32768 Hz), time error ($T_{error}$) generated for 1 hour and a pulse count difference can be expressed in the following equation (4).

$$T_{error} = \left(\frac{1}{X} - \frac{1}{32768}\right) \times 32768 \times 3600 \tag{4}$$

$$\frac{T_{error}}{\frac{1}{X}} = 3600(32768 - X) \tag{5}$$

As shown in equation (5), if the frequency (X) of the low-frequency clock signal is smaller than 32.768 KHz, as many as 3600 (32768−X) are not counted by the RTC circuit 10 for 1 hour, and time information outputted from the RTC circuit 10 is too low relative to actual time.

There are many problems with time generation in the related art. For example, as described above, if the frequency of the low-frequency clock signal generated from the crystal oscillator is changed due to an external condition (a temperature or a voltage), an error occurs in the time information (second, minute, hour) generated from the RTC circuit 10. This makes it impossible for the user to obtain accurate time information from the GSM or other terminal.

In order to compensate for the shortcomings of the related art, a method for implementing a crystal oscillator by using crystal with less error has been proposed. However, such a crystal is relatively expensive compared to the more rudimentary low-priced crystal. Moreover, it is difficult to obtain an accuracy of better than 3~5 ppm (0.26~0.43 sec/day) even with a more stable crystal.

SUMMARY OF THE INVENTION

An object of the invention is to solve at least the above problems and/or disadvantages of the related art.

Another object of the present invention is to provide a time error compensating system and method which accurately compensates for time errors in a signal processing system which, for example, may include a GSM or other communications terminal.

Another object of the present invention is to provide a time error compensating system and method of the aforementioned type which compensates for time errors which specifically arise as a result of external conditions such as temperature and/or voltage changes.

These and other objects of the present invention are achieved by providing a time error compensating apparatus comprising a frequency counting unit configured to count a high-frequency clock signal and a first low-frequency clock signal, a time compensating configured to compare the count values and compute a count compensation value of the first low-frequency clock signal and a Real Time Clock (RTC) circuit configured to update the count value of the first low-frequency clock signal according to the computed count compensation value and further configured to generate time information.

In order to achieve at least the above objects in whole or in parts and in accordance with the purposes of the invention, as embodied and broadly described, there is provided a time error compensating method comprising of computing a frequency ratio between a high-frequency clock signal and a first low-frequency clock signal inputted to an RTC (real time clock) circuit, computing a second low-frequency clock signal according to the computed frequency ratio, comparing a computed pulse count value of the second low-frequency clock signal and a reference pulse count value, computing a pulse count compensation value of the first low-frequency clock signal, outputting the computed compensation value to the RTC circuit; and updating the pulse count value of the first low-frequency clock signal.

The present invention is also a time error compensating apparatus comprising means for counting a high-frequency clock signal and a first low-frequency clock signal, means for comparing the count values and computing a count compensation value of the first low frequency clock signal and means for updating the count value of the first low-frequency clock signal according to the computed count compensation value and for generating time information.

The present invention is also a time error compensating apparatus comprising an interface to a high-frequency and a low frequency input signals, a real time clock circuit configured to generate time information from the low frequency input signal and a compensation circuit configured to detect changes in the low frequency signal with respect to the high frequency signal and output a low frequency compensation value to the real time clock.

The present invention is also a time error compensating method comprising comparing a high-frequency clock signal and a first low-frequency clock signal inputted to an real time clock (RTC) circuit, computing a count compensation value of the first low-frequency clock signal, periodically outputting the computed count compensation value to the RTC circuit and compensating the pulse count value of the first low-frequency clock signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

A GSM or other terminal may include a system clock which generates, for example, a 10 MHz or a 13 MHz high-frequency clock signal for driving a main chip set (Chipset) of the terminal. This high-frequency clock signal may be generated from a voltage-controlled, temperature-compensated crystal oscillator (VCTCXO), which has been shown to demonstrate improved resistance to changes in temperature and which has an accuracy of below 0.15 ppm. In accordance with the present invention, a compensation count value of a low-frequency clock signal is computed using this accurate high-frequency clock signal, and the computed compensation count value is then used as a basis for correcting time errors in, for example, a real-time clock of the terminal.

Figure 1:
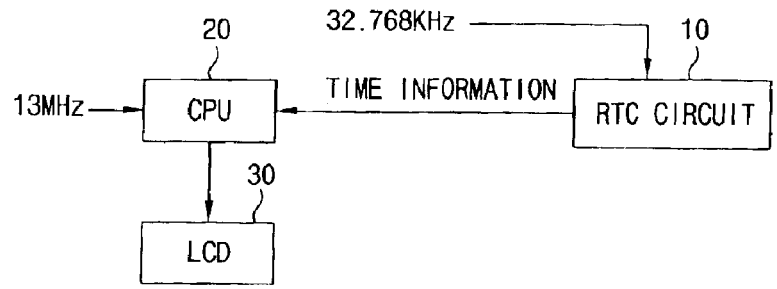
FIG. 1 is a block diagram of a GSM terminal in accordance with a conventional art.
Figure 2:
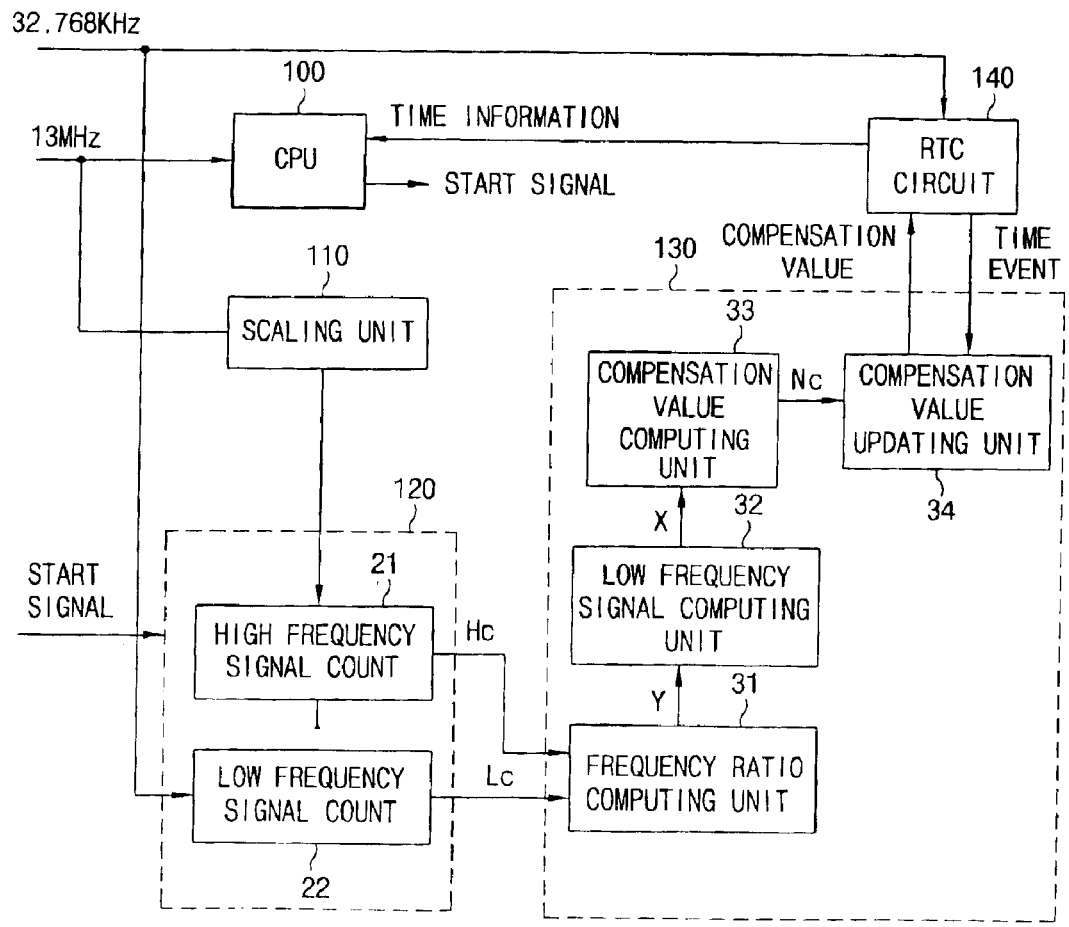
FIG. 2 is a block diagram of a time error compensating apparatus of a GSM or other terminal in accordance with a preferred embodiment of the present invention.

FIG. 2 shows a time error compensating apparatus which, for example, may be used in a GSM or other communications terminal in accordance with one embodiment of the present invention. This apparatus includes a CPU 100, a scaling unit 110, a frequency counting unit 120, a time compensating unit 130, and an RTC circuit 140. The CPU displays time information and controls a time-compensation operation. The scaling unit 110 scales a 13 MHz high-frequency clock signal. The frequency counting unit 120 counts a high-frequency clock signal output of, for example, 65 MHz output from the scaling unit 110 and a concurrently input low-frequency clock signal. The time-compensating unit 130 compares the count values (Hc, Lc) output from the frequency counting unit 120 and computes a compensation count value of a low-frequency clock signal. And, the RTC circuit 140 compensates a count value of the low-frequency clock signal according to the count compensation value output from the time compensating unit 130.

The frequency counting unit 120 includes a counter 21 for counting a high-frequency signal (e.g., 65 MHz) output from the scaling unit 110 for a predetermined duration and a low-frequency signal counter 22 for counting a concurrently input low-frequency signal.

The time compensating unit 130 includes a frequency ratio computing unit 31, a low-frequency signal computing unit 32, compensation value computing unit 33, and a compensating value updating unit 34. The frequency ratio computing unit compares the count values (Hc, Lc) output from the frequency counting unit 120 and computes a frequency ratio (Y) of the low-frequency clock signal to the high-frequency clock signal. The low-frequency signal computing unit 32 computes the currently input low-frequency clock signal according to the computed frequency ratio (Y). The compensation value computing unit 33 compares the count value of the computed low-frequency clock signal and a count value of an ideal low-frequency clock signal and computes a count compensation value ($N_c$). And, the compensation value updating unit 34 updates the RTC circuit with the count compensation value ($N_c$) generated by the compensation value computing unit 33 at a predetermined period.

Figure 3:
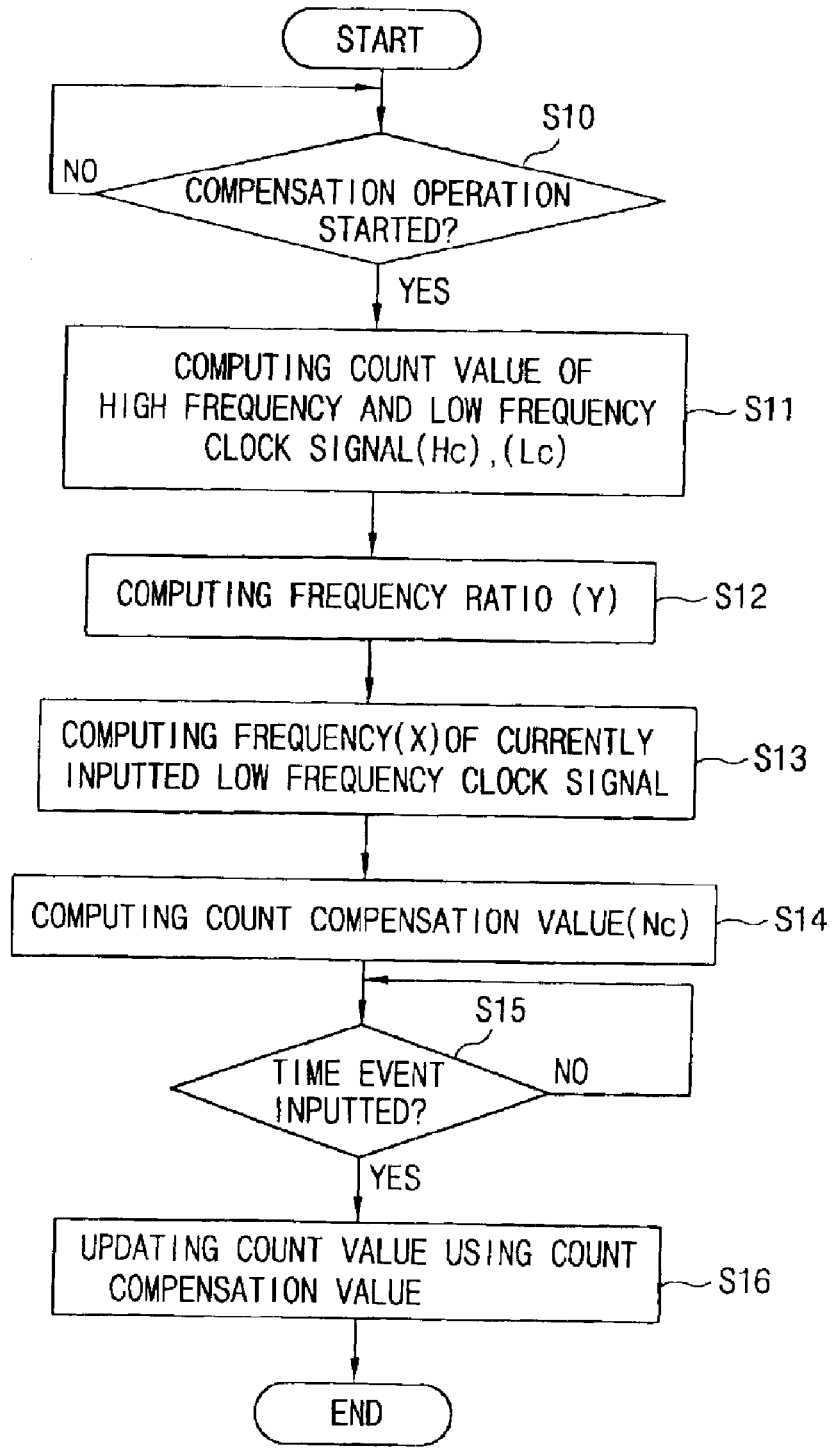
FIG. 3 is a flow chart of a time error compensating method of a GSM or other terminal in accordance with the preferred embodiment of the present invention.

Operation of the time error compensating apparatus in accordance with the present invention will now be described with reference to FIGS. 2 and 3. In a standby state, the RTC circuit 140 counts a 32.768 KHz low-frequency clock signal output from a crystal oscillator and generates time information (e.g., seconds, minutes, hours, etc.). The CPU displays the time information generated by the RTC circuit on a display unit such as a liquid crystal display (not shown).

In this state, it is determined whether a compensation operation has been started. (Step S10). The compensation operation may be started according to a regular time table, or may be initiated conditionally such as, for example, when a certain external condition (temperature, voltage, etc.) is detected. When a compensation operation is initiated, the CPU outputs a compensation start signal and a clock count duration to the frequency counting unit.

The frequency counting unit 120 receives the compensation start signal, counts the high-frequency and low-frequency clock signals during the input clock count duration, and outputs corresponding count values (Hc, Lc) to the time compensating unit 130. (Step S11).

During the clock count duration, the high-frequency counter 21 counts the high-frequency (e.g., 65 MHz) clock signal which has been scaled by a predetermined amount (e.g., 1:5) by the scaling unit, and outputs the count value (Hc). The low-frequency signal counter 22 counts the low-frequency clock signal (X) and outputs the count value (Lc).

The time compensating unit 130 compares the count values Hc and Lc, computes a frequency ratio (Y) of the low-frequency clock signal to the high-frequency clock signal, and then computes the frequency of the low-frequency clock signal according to the computed frequency ratio (Y).

After the low-frequency clock signal is computed, the count value of the corresponding low-frequency clock signal and the count value (32768) of the ideal low-frequency clock signal are compared to compute the count compensation value (Nc) of the low-frequency clock to be used for compensation on a periodic basis, e.g., each hour.

Thus, when a frequency (X) of the low-frequency clock signal is changed due to an external condition (e.g., temperature or voltage), the count number (Nc) of the low-frequency clock signal to be compensated each hour is preferably defined by equation (6) below.

$$Nc=3600\ (X-32768) \quad (6)$$

In order to compute the count number (Nc) of the low-frequency clock signal, the frequency ratio computing unit 31 first computes the frequency ratio (Y) between the scaled high-frequency clock signal and the currently inputted low-frequency clock signal as expressed by equation (7). (Step S12).

$$Y=15914-F \quad (7)$$

where F is a fraction computed as $$\frac{65536 \times Hc}{15 \times Lc}.$$

Once the frequency ratio (Y) is computed, the low-frequency signal computing unit 32 applies the computed frequency ratio to equation (8) and computes a frequency (X) of the currently inputted low-frequency clock signal. (Step S13).

$$X = \frac{13 \times 65536 \times 10^6}{26 \times 10^6 - 3Y} \quad (8)$$

After the frequency (X) of the low-frequency clock signal is computed, the compensation value computing unit 33 compares the count value of the computed low-frequency clock signal and the count value of the ideal low-frequency clock signal to compute the count compensation value (Nc) of the low-frequency clock signal, which is to be used to perform time correction on a periodic basis (e.g., each hour), in accordance with equation (6). (Step S14).

Accordingly, whenever a time event occurs in the RTC circuit 140, in step S15, the compensation value updating unit 34 outputs the count compensation value (Nc) to the RTC circuit 140 each hour, to thereby update the count value of the currently inputted low-frequency clock signal. (Step S16).

In the above-described present invention, the count compensation value (Nc) is disclosed as computed and applied for compensation purposes for each hour. The present invention, however, is not limited to this exemplary application. If desired, the count compensation value (Nc) may be computed for each 1-minute unit or for other units of time.

The present invention has many advantages over its conventional counterparts. For example, when applied to correcting time for a real time clock (RTC) circuit, the present invention has the advantage of correcting a count error that may occur in a low-frequency clock signal as a result of an external condition (e.g., temperature and/or voltage fluctuations). In at least one embodiment, the present invention performs this operation using a high-frequency clock signal, which has demonstrated high accuracy under these conditions. As a result, more accurate time can be obtained while using the low-priced crystal for low-frequency signal generation.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. For example, while the invention has been described as counting a low frequency clock signal of 32,768 KHz, those skilled in the art can appreciate that the invention may be used with or to correct time within systems which operate using other clock frequency values.

I claim:

1. A time error compensating apparatus, comprising:
   a frequency counting unit which counts a first clock signal and a second clock signal, wherein the first clock signal has a higher frequency than the second clock signal; and
   a time compensating unit which includes;
   (a) a comparator which compares count values of the first clock signal and the second clock signal, and
   (b) a computation unit which computes a count compensation value based on an output of said comparator,
   wherein the time compensating unit includes:
   a frequency ratio computing unit which computes a frequency ratio between the first clock signal and the second clock signal based on said count values;
   a signal generating unit which computes a frequency of the second clock signal based on the frequency ratio; and
   a compensation value computing unit which compares said count value of the second clock signal with a count value of a desired value, and which generates said count compensation value based on said comparison.

2. The apparatus of claim 1, further comprising:
   a clock which corrects time information based on the count compensation value computed by the time compensating unit.

3. The apparatus of claim 2, wherein the time compensating unit outputs the count compensation value to the clock based on a time event.

4. The apparatus of claim 3, wherein the time compensating unit outputs the count compensation value to the clock on a periodic basis.

5. The apparatus of claim 1, wherein the frequency counting unit includes:

a first counter which counts the first clock signal; and a second counter which counts the second clock signal.

6. The apparatus of claim 1, wherein the time compensating unit further includes:

a compensation value updating unit which outputs a count value of the second clock signal at a predetermined time interval.

7. The apparatus of claim 6, wherein the frequency ratio computing unit computes the frequency ratio in accordance with the following equation:

Frequency Ratio=15914−$F$

Where the F is $$\frac{65536 \times Hc}{15 \times Lc}$$

and where Hc and Lc are count values of the first and second clock signals, respectively.

8. The apparatus of claim 6, further comprising:

a control unit which generates a clock count duration signal and a count initiation signal, said frequency counting unit counting the first clock signal and the second clock signal for said clock count duration in accordance with said count initiation signal.

9. The apparatus of claim 2, further comprising:

a display unit configured to display the time information, wherein the display unit includes a liquid crystal display.

10. A method for generating time, comprising:

counting a first clock signal and a second clock signal for a predetermined period of time, said first clock signal having a higher frequency than said second clock signal;

computing a compensation value of the second clock signal based on count values generated in said counting step; and correcting time information output by a clock based on said compensation value, wherein said computing step includes:

computing a frequency ratio of the first clock signal and the second clock signal based on said count values;

computing a frequency of said second clock signal based on the frequency ratio;

comparing said frequency of said second clock signal to a desired value; and computing a pulse count compensation value of the second clock signal based on said comparing step.

11. The method of claim 10, wherein the pulse count compensation value is obtained by the following equation:

Pulse count compensation=3600($X$−32768).

12. The method of claim 10, further comprising:

compensating a pulse count value of said second clock signal based on said compensation value.

13. The method of claim 10, further comprising:

generating said first clock signal by scaling a system clock signal based on a predetermined ratio.

14. The method of claim 10, wherein the frequency of said second clock signal is computed by:

$$X = \frac{13 \times 65536 \times 10^6}{26 \times 10^6 - 3Y}$$

wherein Y is the frequency ratio.

15. The method of claim 10, wherein the frequency ratio is calculated by:

Frequency Ratio=15914−$F$ where the F is $$\frac{65536 \times Hc}{15 \times Lc}$$

and where Hc and Lc are count values of the first and second lock signals, respectively.

16. A time error compensating method, comprising:

computing a frequency ratio between a first clock signal and a second clock signal, wherein the first clock signal has a higher frequency than the second clock signal;

computing a frequency of the second clock signal based on the frequency ratio;

computing a pulse count value based on the frequency of the second clock signal;

comparing said pulse count value with a reference pulse count value; and computing a pulse count compensation value for the second clock signal.

17. The method of claim 16, wherein the reference pulse count value is a desired pulse count value of the second clock signal.

18. The method of claim 16, wherein the pulse count compensation value is obtained by the following equation:

Pulse count compensation=3600($X$−32768), where X is the frequency of the second clock signal.

19. The method of claim 16, further comprising:

correcting a time error of a clock based on said pulse count compensation value.

20. A method for generating time, comprising:

counting a first clock signal and a second count signal for a predetermined period of time, said first clock signal having a higher frequency than said second clock signal;

determining an actual frequency of the second clock signal using a frequency of the first clock signal;

comparing the determined actual frequency of the second clock signal with an ideal clock signal corresponding to the second clock signal; and determining a compensation value to be applied to the frequency of the second clock signal based on the comparison of the ideal clock signal and the determined actual frequency of the second clock signal, wherein determining the actual frequency of the second clock signal comprises;

computing a frequency ratio of the second clock signal to the first clock signal.

21. The method of claim 20, further comprising:
down-scaling a frequency of the first clock signal prior to counting the first clock signal.

22. The method of claim 20, wherein the first clock signal drives a main chip set of a GSM terminal and the second clock signal displays time information on the GSM terminal.

23. The method of claim 20, wherein the frequency ratio comprises:

Frequency Ratio=15914−$F$ where the F is $$\frac{65536 \times Hc}{15 \times Lc}$$

and where Hc and Lc are count values of the first and second clock signals, respectively.

24. The method of claim 23, wherein the acutal frequency of the seocnd clock signal is determined using the following equation:

$$X = \frac{13 \times 65536 \times 10^6}{26 \times 10^6 - 3Y}$$

wherein Y is the frequency ratio.

25. The method of claim 24, wherein the compensation value is determined using the following equation:

Pulse count compensation=3600(X−32768).

* * * * *